(12) United States Patent
Jamaly

(10) Patent No.: US 11,217,893 B2
(45) Date of Patent: Jan. 4, 2022

(54) METHODS AND SYSTEMS FOR IMPLEMENTING AND OPERATING MULTIPLE-INPUT AND MULTIPLE-OUTPUT (MIMO) ANTENNAS FOR RADIO TELECOMMUNICATIONS

(71) Applicant: Swisscom AG, Bern (CH)

(72) Inventor: Nima Jamaly, Bern (CH)

(73) Assignee: SWISSCOM AG

( * ) Notice: Subject to any disclaimer, the term of this patent is extended or adjusted under 35 U.S.C. 154(b) by 0 days.

(21) Appl. No.: 16/368,005

(22) Filed: Mar. 28, 2019

(65) Prior Publication Data
US 2019/0305425 A1 Oct. 3, 2019

(30) Foreign Application Priority Data

Mar. 29, 2018 (GB) .................................. 1805286.0

(51) Int. Cl.
| | | |
|---|---|---|
| *H01Q 7/00* | (2006.01) | |
| *H04B 7/0413* | (2017.01) | |
| *H01Q 21/00* | (2006.01) | |

(52) U.S. Cl.
CPC ........... *H01Q 7/00* (2013.01); *H01Q 21/0025* (2013.01); *H04B 7/0413* (2013.01)

(58) Field of Classification Search
CPC .............................. H01G 7/00; H01G 21/0025
See application file for complete search history.

(56) References Cited

U.S. PATENT DOCUMENTS

| | | |
|---|---|---|
| 2004/0051675 A1 | 3/2004 | Inoue |
| 2007/0052587 A1 | 3/2007 | Cheng |
| 2007/0164868 A1 | 7/2007 | Deavours et al. |
| 2008/0048867 A1 | 2/2008 | Oliver et al. |
| 2008/0136720 A1 | 6/2008 | Parsche et al. |
| 2011/0102269 A1 | 5/2011 | Sato et al. |
| 2013/0242711 A1 | 9/2013 | Fujisawa |
| 2014/0240181 A1 | 8/2014 | Mamuro et al. |

(Continued)

FOREIGN PATENT DOCUMENTS

| | | |
|---|---|---|
| CN | 107317092 | 11/2017 |
| EP | 1450438 | 8/2004 |

OTHER PUBLICATIONS

European Search Report for EP19165990, dated Jul. 31, 2019, 8 pages.

(Continued)

*Primary Examiner* — Graham P Smith
(74) *Attorney, Agent, or Firm* — McAndrews, Held & Malloy, Ltd.

(57) ABSTRACT

Methods and systems for implementing and operating antennas, particularly multiple-input and multiple-output (MIMO) antennas, for radio telecommunications. An antenna configured for MIMO communications may comprise a planar dielectric substrate, a first conductive annulus on a first surface of the substrate, a first conductive land on the first surface, and a second conductive land provided on the first surface. The first conductive land may lie in a region of the first surface bounded by the first conductive annulus and an edge of the first conductive land that is adjacent to, and parallel to, a portion of an inward edge of the first conductive annulus. An edge of the second conductive land may be adjacent to, and parallel to, a portion of an outward edge of the first conductive annulus.

45 Claims, 5 Drawing Sheets

(56) References Cited

U.S. PATENT DOCUMENTS

2018/0358707 A1    12/2018    Jamaly

OTHER PUBLICATIONS

11th European Conference on Antennas and Propagation 2017, pp. 3575-3579, Penafiel-Ojeda et al., "Design of a Low Profile Unidirectional UWB Antenna for Multi-Service Base Station".
British Search Report for GB1805286.0, dated Mar. 7, 2019, 7 pages.
"Uniplanar UWB Antenna for Diversity Applications", B.P. Chacko, G. Augustin and T.A. Denidni, Proceedings of the 2012 IEEE International Symposium on Antennas and Propogation, Chicago, IL 2012, pp. 1-2.
"Uniplanar Slot Antenna for Ultrawideband Polarization-Diversity Applications", B.P. Chacko, G. Augustin and T.A. Denidni, IEEE Antennas and Wireless Propagation Letters, vol. 12, pp. 88-91, 2013.
"Uniplanar Polarisation Diversity Antenna for Ultrawideband Systems", B.P. Chacko, G. Augustin and T.A. Denidni, IET Microwaves, Antennas & Propagation, vol. 7, No. 10, pp. 851-857, Jul. 16, 2013.
"Design of a Low Profile Unidirectional UWB Antenna for Multi-Service Base Station", C.R. Penafiel-Ojeda, M. Cabedo-Fabres, N.M. Mohamed-Hicho and M. Ferrando-Bataller, 2017 11th European Conference on Antennas and Propogation (EUCAP), Paris, 2017, pp. 3575-3579.
European Examination Report for EP19165990.3, dated Mar. 18, 2021, 9 pages.
"Ultrawideband (UWB) Antennas With Multresonant Split-Ring Loops", G.M. Yang et al, IEEE Transactions on Antennas and Propagation, vol. 57, No. 1, Jan. 2009.

METHODS AND SYSTEMS FOR IMPLEMENTING AND OPERATING MULTIPLE-INPUT AND MULTIPLE-OUTPUT (MIMO) ANTENNAS FOR RADIO TELECOMMUNICATIONS

CLAIM OF PRIORITY

Pursuant to 35 U.S.C. § 119, this patent application claims the filing date benefit of and right of priority to United Kingdom (GB) Patent Application No. 1805286.0, dated Mar. 29, 2018. The above application is hereby incorporated herein by reference in its entirety.

TECHNICAL FIELD

The present disclosure relates to communication solutions. In particular, various embodiments in accordance with the present disclosure relate to methods and systems for implementing and operating antennas, particularly multiple-input and multiple-output (MIMO) antennas, for radio telecommunications.

BACKGROUND

The present disclosure relates to antennas. In this regard, conventional antenna systems and methods for implementing and using them in telecommunications networks, if any existed, may be costly, cumbersome and inefficient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and/or methods are provided for implementing and operating multiple-input and multiple-output (MIMO) antennas for radio telecommunications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION

Figure 1:
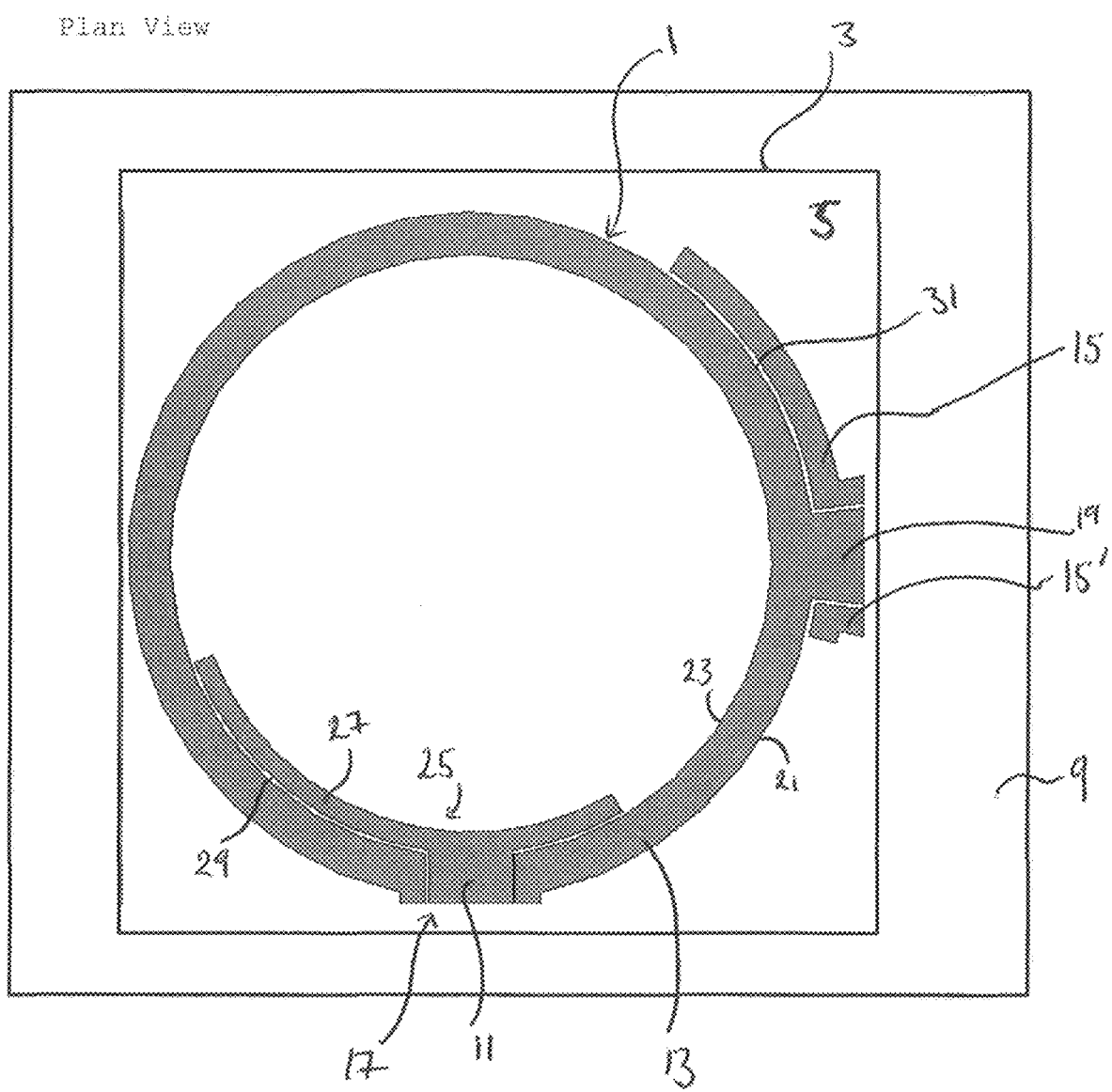
FIG. 1 illustrates a plan view and an end view of an example antenna, in accordance with the present disclosure.
Figure 1:
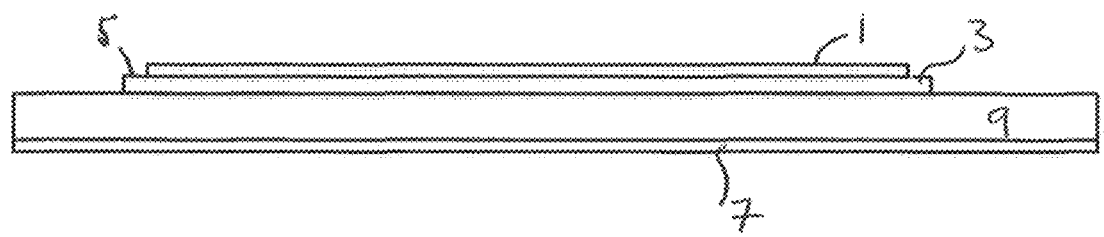

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Certain example implementations in accordance with the present disclosure may be found in systems and methods for implementing and operating multiple-input and multiple-output (MIMO) antennas for radio telecommunications, as described in more detail below. In this regard, ultra-wideband (UWB) is a radio technology that uses a very low energy level for short-range, high-bandwidth communications over a large portion of the radio spectrum. For example, in typical UWB communications transmit information may be spread over a bandwidth of 500 MHz or more. The International Telecommunication Union Radio-communication Sector (ITU-R), for example, defines UWB as an antenna transmission for which emitted signal bandwidth exceeds the lesser of 500 MHz or 20% of the arithmetic center frequency.

Use of UWB communications may be preferable in some settings due to desirable performance characteristics. For example, bandwidth and time resolution are inherently related, with the upper limit on the pulse rate of a communication method typically being set by the communication bandwidth. Thus, UWB based systems may enable more accurate use of techniques such as pulse-position or time modulation. Information may also be modulated on UWB signals (pulses) by encoding the polarity of the pulse, its amplitude and/or by using orthogonal pulses.

Existing antenna solutions for use in conjunction with UWB communications may be have some disadvantages and/or shortcomings. Accordingly, various example implementations in accordance with the present disclosure may be directed at providing low profile antenna systems that support multiple-input and multiple-output radio communications, particularly for use in conjunction with ultra-wideband (UWB) communications. For example, certain implementations in accordance with the present disclosure may antenna systems that provide two transmit and/or receive channels in a single antenna structure.

An example antenna in accordance with the present disclosure may comprise a first conductive annulus carried by a first surface of a dielectric substrate, the annulus having an outward edge and an inward edge surrounded by the outward edge, a first conductive land carried by the first surface, wherein the first land lies in a region of the surface bounded by the annulus and a ring-side edge of the first land may be adjacent to, and parallel to, a portion of the inward edge of the annulus, and a second conductive land carried by the first surface wherein a ring-side edge of the second land may be adjacent to, and parallel to, a portion of the outward edge of the annulus.

A first waveguide may be provided by a slot between the ring-side edge of the first conductive land and the portion of the inward edge of the annulus adjacent to the ring-side edge of the first conductive land. A second waveguide may be provided by a slot between the ring-side edge of the second conductive land and the portion of the outward edge of the annulus adjacent to the ring-side edge of the second conductive land. These two waveguides may be arranged so that each one excites a different one of two orthogonal characteristic current modes of the antenna.

These two modes may be, for example, harmonic modes of the antenna, such as the fundamental mode ($f_0$) with different characteristics—e.g., orthogonal, polarization, etc. Each of the two waveguides may be connected to a different signal connection (e.g., a feed point). Thus, each signal connection may be used to transmit/receive via the antenna using a different one of these two orthogonal modes. This may provide a UWB based antenna having multiple-input and multiple-output (MIMO) functionality.

The magnetic coupling to the signal feeds may excite the fundamental characteristic mode of the ring/annulus. The ring/annulus may provide a degree of decoupling between the two conductive lands/waveguides to enable the two orthogonal modes to be controlled independently thus to provide two transmit/receive channels.

A ground plane may be provided by a flat conductor provided on the other side of the substrate from the antenna. This may provide a unidirectional radiation pattern from the antenna side of the substrate, away from the ground plane side. The waveguides may be coplanar waveguides.

The ring-side edge of a conductive land may be the edge closest to the inward or outward edge of the annulus. In this regard, generally it may be curved (e.g., arc shaped) and parallel to the edge of the annulus.

The annulus and the conductive lands may each be provided by a laminar conductor carried by the substrate. For example, the annulus and the conductive lands may each comprise a flat sheet of conductive material. Such conductive material may be disposed on the surface of the substrate—e.g., it may be adhered to the surface e.g., by deposition or otherwise.

The first conductive land may comprise a first arc shaped part. The radially outward edge of this first arc may be adjacent to the annulus.

The first conductive land may further comprise a first stem connected to the first arc. This first stem may transect a portion of the annulus from the inward edge to the outward edge, and may be separated from the annulus—e.g., by a gap between the stem and the adjacent parts of the annulus.

For example, the first stem may cut across part of the annulus at a location around its circumference. The first stem may lie on the first surface of the substrate where it may extend radially outward from the radial outer edge (e.g., the ring-side edge) of the first arc (the arc shaped part of the first land).

The second conductive land may be disposed outside the annulus. It may comprise a second arc shaped part. The radially inward edge of this second arc may be adjacent the annulus.

A second stem may be connected to the outward edge of the annulus. The second stem may be provided by a laminar conductor carried by the substrate as explained above. The second stem may lie on the first surface of the substrate adjacent to and parallel to an edge of the second land. The second land may comprise an arc shaped portion parallel to the outside edge of the annulus.

The edge of the second land adjacent to and parallel to the second stem may be provided, at least in part, by an end of the arc shaped portion of the second land. The second land may also comprise a third stem joined to the arc shaped portion and lying parallel to the first stem. The second land may be grounded. For example the third stem may be connected to a reference voltage such as a ground. The third stem may extend in a radial direction, radially outward from an end of the second arc shaped part of the second land.

The first stem and the second stem may be substantially orthogonal to each other. For example, the first stem and the second stem may be disposed at about 90° with respect to each other on the surface of the substrate. The angular separation about the circumference of the annulus between the first stem and the second stem may be about 90°.

The first land and the second land may be disposed adjacent different parts of the annulus. For example, they may be angularly separated about the circumference of the annulus (e.g., in some possibilities), at any given location about the circumference only a single edge of the annulus (inward or outward) may be bounded by one of the lands.

A first signal connection may be connected to the first land—e.g., it may be connected to the first stem. Such signal connection may comprise a connection to an RF transmitter and/or receiver apparatus for sending and/or receiving a first RF signal. The annulus may be grounded (e.g., connected to a reference voltage such as ground). The location at which the annulus may be grounded may be adjacent (e.g., alongside) the first land. For example, an edge (or edges) of the annulus which are adjacent to the edges of the first stem may be grounded.

A second signal input may be connected to the annulus. For example, the second signal connection may be connected to a portion of the annulus which lies adjacent (e.g., alongside) the second land—e.g., it may be connected to the second stem.

For example, a first signal connection may be connected to the first land, and a second signal connection connected to an edge of the annulus adjacent the second land. In this example, the edge of the annulus adjacent to the first land may be grounded and the second land may be grounded. As an alternative, a first signal connection may be connected to an edge of the annulus adjacent to the first land, and a second signal connection may be connected to the second land. In this alternative example implementation, the first land may be grounded and an edge of the annulus adjacent the second land may be grounded.

Antennas in accordance with these and other implementations may be connected to a multiple-input and multiple-output (MIMO) transceiver to provide multi-channel communication. One polarization mode of the antenna may be operated via a signal connection connected to the first land, for example, and a second orthogonal polarization mode of the antenna may be operated via a signal connection to the annulus. For example a first transmitting and/or receiving apparatus may be connected to the first land, while a second transmitting and/or receiving apparatus may be connected to the annulus. The first transmit/receive apparatus may thus provide a first input/output channel using one polarization mode of the antenna, while the second transmit/receive may provide a second input/output channel using the other polarization mode of the antenna (orthogonal to the first mode).

FIG. 1 illustrates a plan view and an end view of an example antenna, in accordance with the present disclosure. Shown in FIG. 1 is an antenna 1 disposed on the surface of a flat dielectric substrate 3.

In this regard, in the example implementation shown in FIG. 1, the substrate 3 comprises a dielectric having a permittivity of between about 3.2 and 3.6. The substrate 3 may be 0.8 mm thick, or between about 0.5 mm and 1.5 mm. The substrate may be square and 50 mm wide. Nonetheless, it should understand that these sizes and shapes are non-limiting, and as such other sizes and shapes may be used.

As shown in FIG. 1, the antenna 1 is provided by an arrangement of laminar conductors 13, 15, 15', 25 on this surface. The antenna 1 comprises an annular land 13, a first land 25, and a second land 15, 15'.

The annular land 13 illustrated in FIG. 1 comprises a circular annulus provided by an incomplete circular track. It is incomplete because a port 17 transects the annulus at a first location on its circumference. The annulus may have a radius of about 23 mm measured from the center of that incomplete circle to the middle of the track's width, and the track may have a width of about 3 mm (e.g., it has an inner radius (the distance from its of about 21.5 mm, and an outer radius of about 24.5 mm). Other dimensions may be used. The laminar conductor which makes up these lands 13, 15, 15', 25, may comprise copper and may be about 35 μm thick.

The annular land 13 also comprises a stem 19, which extends radially out from an outward edge 21 of the annulus. The stem 19 of the annulus may be spaced from the port 17 by about ¼ the circumference of the annulus, e.g., the angular separation of the port 17 in the annulus and the stem 19 of the annulus (subtended at the center of the annulus) may be about 90°. The stem 19 of the annulus may be tapered in that it may be narrower where it joins the outward edge 21 of the annulus than at the radial outer end. For example, it may have the form of an arc of a second circular annulus having an inner radius equal to the outer radius of the annular land.

As shown in FIG. 1, the first land 25 is substantially T-shaped with a straight stem 11 and an arc shaped T-bar 27. The stem 11 of the T-shape occupies the port 17 in the annulus, cutting across the annulus from its radially outward edge 21 into the interior region it surrounds. The end edges of the annular land 13 which lie adjacent to each side of the stem 11 of this T-shaped land 25, may be parallel with the adjacent edges of the stem 11.

The arc shaped T-bar 27 lies at the radially inward end of the straight stem 11. This arc shaped portion 27 extends alongside the radially inward edge 23 of the annulus either side of the port 17. The radially outward edge of the arc shaped T-bar 27 is parallel to the radially inward edge 23 of the annulus. It is also spaced from that edge by a selected distance (labelled g2 in FIG. 6) across the first surface 5 of the substrate 3. This distance may be the same as the spacing between the sides of the stem of the T-bar and the end edges of the annular land adjacent to that stem. This spacing is labelled g1 in FIG. 6.

The arc shaped portion 27 of the first land 25 may occupy less than about ⅓ of the circumference of the radially inward edge 23 of the annulus, for example it may subtend an angle at the center of the annulus of less than 120°. The length of this part 27 of the first land 25 (its extent along the circumference of the annulus) may be selected based on the radius of the annulus. For example the annulus may have a radius of about 23 mm in which case the first land may occupy about ⅓ of the circumference of the radially inward edge 23 of the annulus.

The length of the arc shaped portion 27 may be selected based on the operating frequency of the antenna. For example, the arc shaped portion 27 may be around 25 mm long, and this may provide a resonance frequency at 3 GHz (as 25 mm is a quarter wavelength, as explained in more detail below). The length of the arc shaped portion 27 may be changed to vary the frequency.

The radius of the ring may be chosen based on the desired operation frequency range of the antenna. For an operating frequency band of around 3 GHz, the radius of the annulus (main ring radius may be about 23 mm measured from the center of the ring, to the middle of the conductive track which makes it up). The width of the ring may be about around 3 mm. This means the inner radius of the ring in FIG. 1 (23) would be 21.5 mm.

The second land 15, 15' illustrated in FIG. 1 comprises two substantially L-shaped parts, which lies either side of the stem 19 of the annular land. These two L-shaped parts are different sizes, and lie on either side of the stem 19 of the annulus. The larger of the two L-shaped parts lies on the far side of the stem 19 from the port into the annulus. The 'back' of this L-shaped part is arc shaped, whereas the 'base' of this L-shaped part is straight. The arc shaped back of the 1' lies alongside the radially outward edge 21 of the annular land adjacent the stem 19 of the annulus. The edge of this arc shaped part that is adjacent to the annular land is parallel to the radially outward edge 21 of the annulus.

The bottom edge of the base of the 1' runs parallel to the edge of the stem 19 of the annulus. The spacing between the L-shape and the annular land may be even along the length of these edges. The smaller of the two L-shaped parts lies on the side of the stem 19 from the larger one (e.g., on the side nearest to the port into the annulus). The 'back' of this smaller L-shaped part is straight and lies alongside the stem 19 of the annulus whilst the 'base' of this smaller L-shaped part may be arc shaped and lies alongside the radially outward edge 21 of the annular land, for a short part of that edge between the stem 19 and the port.

A first slot 23 is formed by the space between the curved edge of the first conductive land 25 and the part of the inward edge 23 of the curved annulus adjacent to that curved edge. This slot 29 may act as a wave guide. An RF signal may be applied to the first conductive land 25, or to the part of the annulus 13 which lies alongside the curved edge of the first conductive land 25, to excite this slot 29 and drive one polarization mode of the fundamental frequency of the antenna 1.

A second slot 31 is formed by the space between the curved edge of the second conductive land 15 and the part of the outward edge 21 of the annulus adjacent to that curved edge. This slot 31 may act as a second wave guide. Thus, an RF signal may be applied to the second conductive land 15, 15' or to the part of the annulus which lies alongside the curved edge of the second conductive land 15, to excite this slot and drive one mode of the antenna 1, such as the fundamental frequency of the antenna 1.

A ground plane conductor 7 is also shown in FIG. 1, this ground plane conductor is on the other side of the substrate 3 from the antenna 1, and may be separated from the substrate 3 by a further dielectric 9. This further dielectric 9 may comprise an air gap, and may comprise a spacer material such as foam. The spacing between the first surface 5 of the substrate 3 and the ground plane 7 may be about 1.5 cm. The whole antenna 1 apparatus, including this further dielectric 9 and a ground plane (e.g., a so-called PEC ground plane) may be provided within a box, or any other type of encapsulation.

Such encapsulation may be adapted to enable the apparatus to be secured to a window pane of a domestic dwelling, commercial premises, or other buildings. In some embodiments, the further dielectric 9 may be provided by the window pane. In these embodiments, the back side of the substrate 3 may be fixed (e.g., by adhesive) to one side of the window pane, and the ground plane conductor may be provided by a conductive mesh disposed on the other side of the window pane. Where a ground plane conductor is provided (with or without the further dielectric) the two slots described above may act as a so-called 'conductor backed' coplanar waveguide.

The first slot 29 (formed by the first conductive land 25), and the second slot 31 (formed by the second conductive land 15), may be arranged transverse to one another. For example the slot 29 may be orthogonal to the slot 31 on the surface of the substrate 3. For example, the angular separation between their respective centers may be 90°. The slots themselves 29, 31, are curved and need not be orthogonal in a precise geometric sense. The feed of each slot (e.g., its connection to a transmit/receive signal) may be separated from the feed of the other slot by 90° about the circumference of the antenna.

An RF signal may be applied to the first conductive land 25, or to the annulus adjacent the first conductive land, to excite the first slot and drive one polarization mode of the antenna 1. Likewise, an RF signal may be applied to the second conductive land 15, 15', or to the annulus adjacent the second conductive land, to excite the second slot 31 and drive a second polarization mode of the antenna 1 (orthogonal to the first polarization mode). The first and second mode may be, for example, orthogonal fundamental (first order) modes. Two independent RF signals may thus be communicated simultaneously via the antenna 1. As noted above, the 'back' of the larger L-shaped part 15 of the second land is arc shaped, whereas its 'base' is straight. In some embodiments, both the 'back' and the 'base' of this L-shaped land 15 may be straight. However without wishing to be bound by theory, it is believed that coupling between these two independent RF signals may be reduced by the use of a curved (arc shaped) edge on the back of this L-shaped part 15 of the second land.

Figure 2:
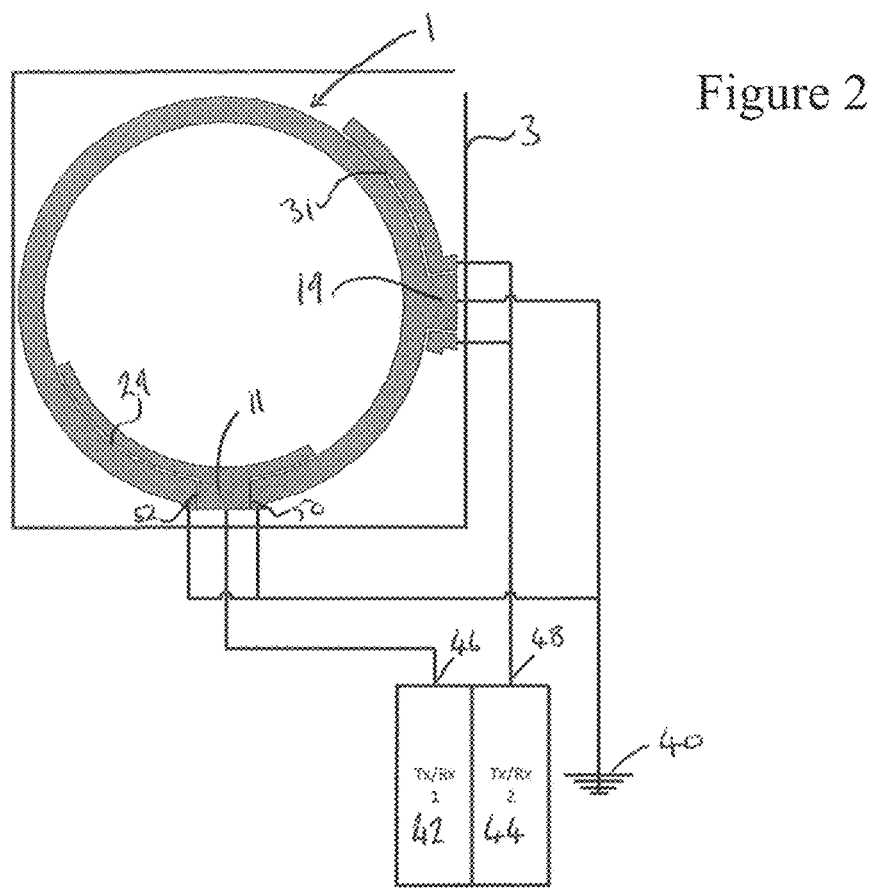
FIG. 2 illustrates an example arrangement of a multiple-input and multiple-output (MIMO) communications apparatus, in accordance with the present disclosure.

FIG. 2 illustrates an example arrangement of a multiple-input and multiple-output (MIMO) communications apparatus, in accordance with the present disclosure. Shown in FIG. 2 a first signal connection arrangement for an antenna implemented in accordance with the present disclosure, such as the antenna 1 as described with reference to FIG. 1.

In this regard, also shown in FIG. 2 in addition to the antenna 1, are a ground connection 40, and two transmit/receive (Tx/Rx) apparatuses 42, 44, each of comprising suitable circuitry for facilitating transmitting and receiving of RF electrical signals, independently of the other.

Each of the transmit/receive apparatuses 42, 44 comprises an input/output signal connection 46, 48 for RF electrical signals. In this regard, the input/output signal connection 46 of the first transmit/receive apparatus 42 is connected to the stem 11 of the first land 25 of the antenna 1. At either side of the stem 11, adjacent end edges 50, 52 of the annulus 13 are connected to ground 40. The input/output signal connection 48 of the second transmit/receive apparatus 44 is connected to the stem 19 of the annular land. The two L-shaped parts of the second land 15, 15' are connected to ground 40.

In operation, the first transmit/receive apparatus 42 applies an RF signal to the first land 25 to excite the waveguide provided by the first slot 29. This drives a first polarization of the fundamental harmonic mode of the antenna 1. Similarly, the second transmit/receive apparatus 44 applies an RF signal to the annular land 13 via its stem 19 to excite the waveguide provided by the second slot 31. The relative spatial arrangement of the first slot and the second slot (e.g., the two optionally being oriented transverse, e.g., orthogonal, to each other) may enable the antenna to drive a second polarization of the fundamental harmonic mode of the antenna 1, orthogonal to the first polarization.

Figure 3:
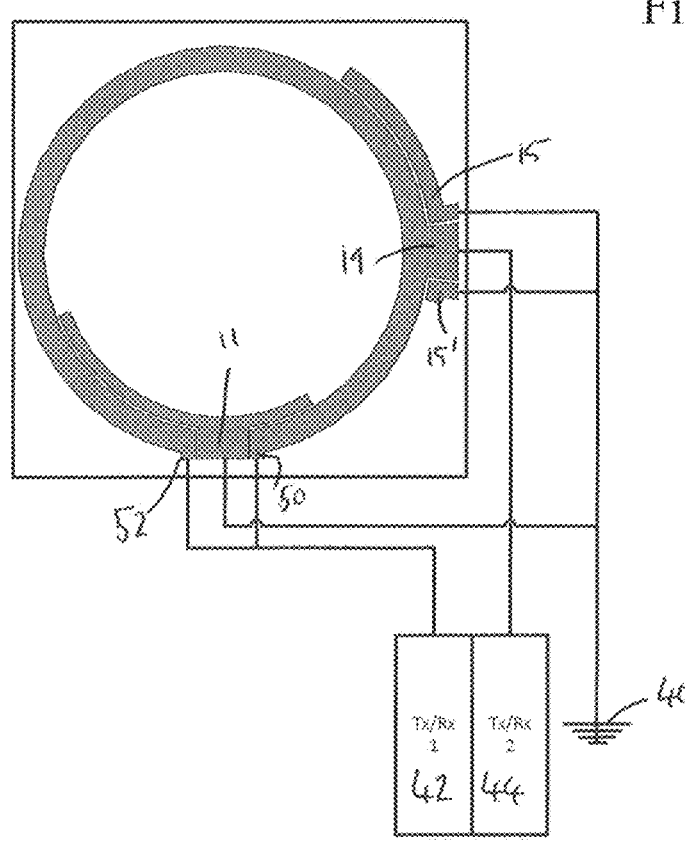
FIG. 3 illustrates another example arrangement of a communications apparatus, in accordance with the present disclosure.

FIG. 3 illustrates another example arrangement of a communications apparatus, in accordance with the present disclosure. Shown in FIG. 3 is a second and alternate signal connection arrangement for the antenna 1 as described with reference to FIG. 1.

In this regard, shown in FIG. 3 are the antenna 1, the ground connection 40, and the two transmit/receive (Tx/Rx) apparatuses 42, 44, as described with respect to FIGS. 1 and 2. As shown in the implementation illustrated in FIG. 3, the stem 11 of the first land 25 of the antenna 1 is connected to ground 40. At either side of this stem 11, the adjacent end edges 50, 52 of the annulus are connected to the input/output signal connection 46 of the first transmit/receive apparatus 42.

The two L-shaped parts of the second land 15, 15' are connected to the input/output signal connection 48 of the second transmit/receive apparatus 44. The stem 19 of the annular land is connected to ground 40.

In operation, the first transmit/receive apparatus 42 applies an RF signal to the annulus 13 to excite the waveguide provided by the first slot 29. This drives a first polarization of the fundamental harmonic mode of the antenna 1. Similarly, the second transmit/receive apparatus 44 applies an RF signal to the second land 15, 15' to excite the waveguide provided by the second slot. As with the arrangement shown in FIG. 2, this may drive a second polarization of the fundamental harmonic mode of the antenna 1, orthogonal to the first polarization.

The transmit/receive apparatuses 42, 44 illustrated in FIGS. 2 and 3 may comprise any appropriate transceiver. For example typically such apparatus may comprise an impedance matching circuit for connection to the antenna 1, a receive amplifier connected to the impedance matching circuit for amplifying received signals, and a demodulator for demodulating data carried by the signals. It may also comprise a modulator for encoding data onto an RF signal to be transmitted, and a transmit amplifier for boosting the power of modulated RF signals to be transmitted via the matching circuit to the antenna 1.

Existing systems may require the antenna parts which excite each of the two modes of polarization of the antenna to have the same configuration, or at least to have degree of symmetry. Such systems may rely on this equivalent excitation configuration to provide a balanced unidirectional radiation pattern. In implementations in accordance with the present disclosure, however, parts of the antenna which drive one polarization of the fundamental harmonic mode of the antenna 1 may be configured differently from parts of the antenna 1 which drive the orthogonal polarization of that same mode. They may also permit the two polarizations to be decoupled—e.g., by the provision of a magnetic (e.g., inductive and perhaps also capacitive) coupling between one signal feed and the inward edge 23 of the annulus to drive one polarization, and magnetic (e.g., inductive and perhaps also capacitive) coupling between a second signal feed and the outward edge 21 of the annulus to drive the orthogonal polarization.

Figure 4:
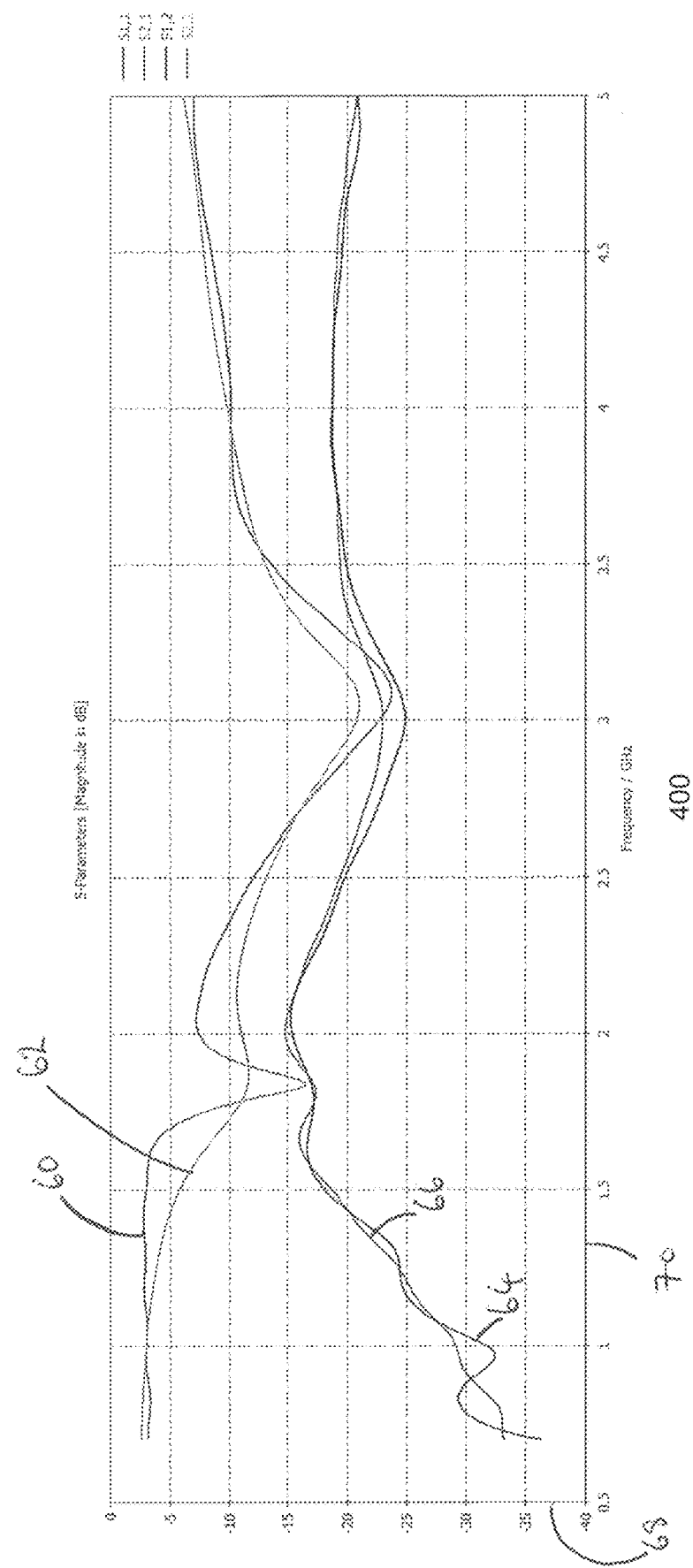
FIG. 4 illustrates an example chart of parameters of an antenna, in accordance with the present disclosure.

FIG. 4 illustrates an example chart of parameters of an antenna, in accordance with the present disclosure. Shown in FIG. 4 is a chart 400 illustrating the S-parameters of an antenna, such as the antenna 1 as describe with reference to FIG. 1, over a particular frequency range (e.g., 0.5 GHz to 5 GHz).

The X-axis 70 of chart 400 indicates frequency, and the major increment between marks on this X-axis is 0.5 GHz. The Y-axis 68 of chart 400 indicates the S-parameters magnitude in dB. The parameter $S_{1,1}$ is indicated on these axes by the line marked with reference numeral 60. The parameter $S_{2,2}$ is indicated on these axes by the line marked with reference numeral 62. The parameter $S_{1,2}$ is indicated on these axes by the line marked with reference numeral 64. The parameter $S_{2,1}$ is indicated on these axes by the line marked with reference numeral 66.

In this regard, the S-parameters illustrated in FIG. 4 ($S_{1,1}$, $S_{1,2}$, $S_{2,1}$, and $S_{2,2}$) describe the input-output relationship between ports of an electrical system. For example, as shown in FIG. 4, the parameter $S_{1,2}$ represents the power transferred from the second signal connection (Port 2) to the first signal connection (Port 1) of the antenna. For example, with reference to FIGS. 1 to 3, the first signal connection (Port 1) may be provided by the stem 11 of the first land 25 together with the adjacent end edges 50, 52 of the annulus 13. Likewise, the second signal connection (Port 2) may be provided by the stem 19 of the annulus together with the second land 15, 15'.

The parameter $S_{2,1}$ represents the power transferred from the first signal connection to the second signal connection. The parameters $S_{1,1}$ and $S_{2,2}$ represent how much power is reflected by the antenna at the first and second signal connections respectively. These parameters are thus often referred to as the reflection coefficient or return loss of the antenna.

Significantly, it may be seen from FIG. 1 that the parameters $S_{2,1}$ and $S_{1,2}$ are less than −17 dB in frequency bands around 1800 MHz, 2400 MHz, 2600 MHz, and 3500 MHz. The return loss ($S_{1,1}$ and $S_{2,2}$) at the two ports of the antenna at these bands is greater than 10 dB.

The parameter $S_{1,1}$ is between about −2 dB and −3 dB in the range from 0.7 GHz to about 1.7 GHz. It then exhibits a notch, which drops to about −17 dB at about 1.8 GHz before rising to local maxima of about −7 dB at about 2.1 GHz. It then reduces approximately linearly to a minimum of about −23 dB at about 3.1 GHz before rising approximately linearly to −10 dB at about 3.75 GHz. It is approximately constant at this level between 3.75 GHz and 4.25 GHz, from where it rises approximately linearly to −8 dB at 5 GHz. The parameter $S_{2,2}$ is similar, but the notch at 1.8 GHz is less deep.

The parameters $S_{1,2}$ and $S_{2,1}$ may rise from about −33 dB at 0.7 GHz to about −17 dB at about 1.6 GHz. They both then dip slightly to about −18 dB at about 1.8 GHz before rising again to about −15 dB at 2 GHz. Both then drop approximately linearly to −25 dB (for $S_{1,2}$) and −23 dB (for $S_{2,1}$) at 3 GHz. Both then may rise to about −19 dB at about 3.6 GHz, and they remain more or less at this level until 5 GHz. This is just one example of the antenna performance which may be achieved according to the principles of the present disclosure.

Figure 5A:
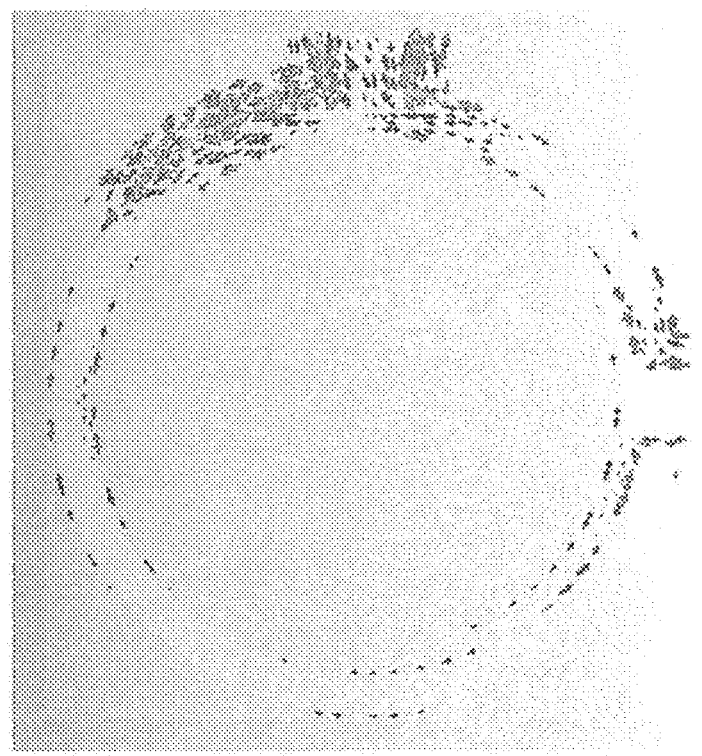
FIGS. 5A and 5B illustrate a general indication of current density in example use scenario of an antenna, in accordance with the present disclosure.
Figure 5B:
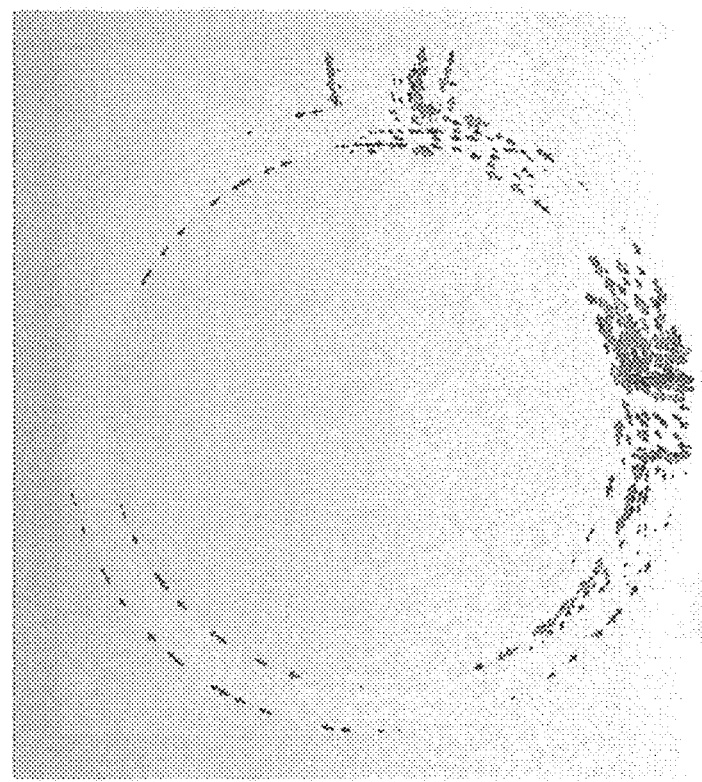

FIGS. 5A and 5B illustrate a general indication of current density in example use scenario of an antenna, in accordance with the present disclosure. Shown in FIGS. 5A and 5B are density plots illustrating current distribution at 3500 MHz.

In this regard, FIG. 5A illustrates the surface current density associated with driving the antenna via the first port (e.g., the first land 25, and the adjacent edges of the annulus). Inset B indicates the surface current density associated with driving the antenna via the second port (e.g., the second land 15, 15', and the adjacent edges of the annulus).

As illustrated in FIG. 5A, the antennas of the present disclosure may provide a current distribution associated with the first land 25 that is predominantly concentrated on the edges of the first land 25 adjacent to the annulus on the side of the "T-shape" which is closest to the second land 15, 15', and on the adjacent edges of the annulus. These currents may be primarily directed in a radial direction along the end edge of the annulus and the adjacent edge of the stem of the T-shape, with a lesser component also in a circumferential direction, aligned with the inward edge 23 of the annulus, and directed toward the second land 15, 15'. These currents may also have a circumferential and radial component adjacent the edges of the smaller part of the second land 15, 15'.

As illustrated in FIG. 5B, the antennas of the present disclosure may provide a current distribution associated with the second land 15, 15' that is predominantly concentrated on the outward edge 21 of the annulus on the far side of the stem 19 of the annular land from the first land 25, and on the edge of the second land 15, 15' adjacent to this part of the outward edge 21 of the annulus. They may also have a significant radial component along the edges of the stem 19 of the annular land, and the edges of the second land 15, 15' adjacent to this stem 19.

Figure 6A:
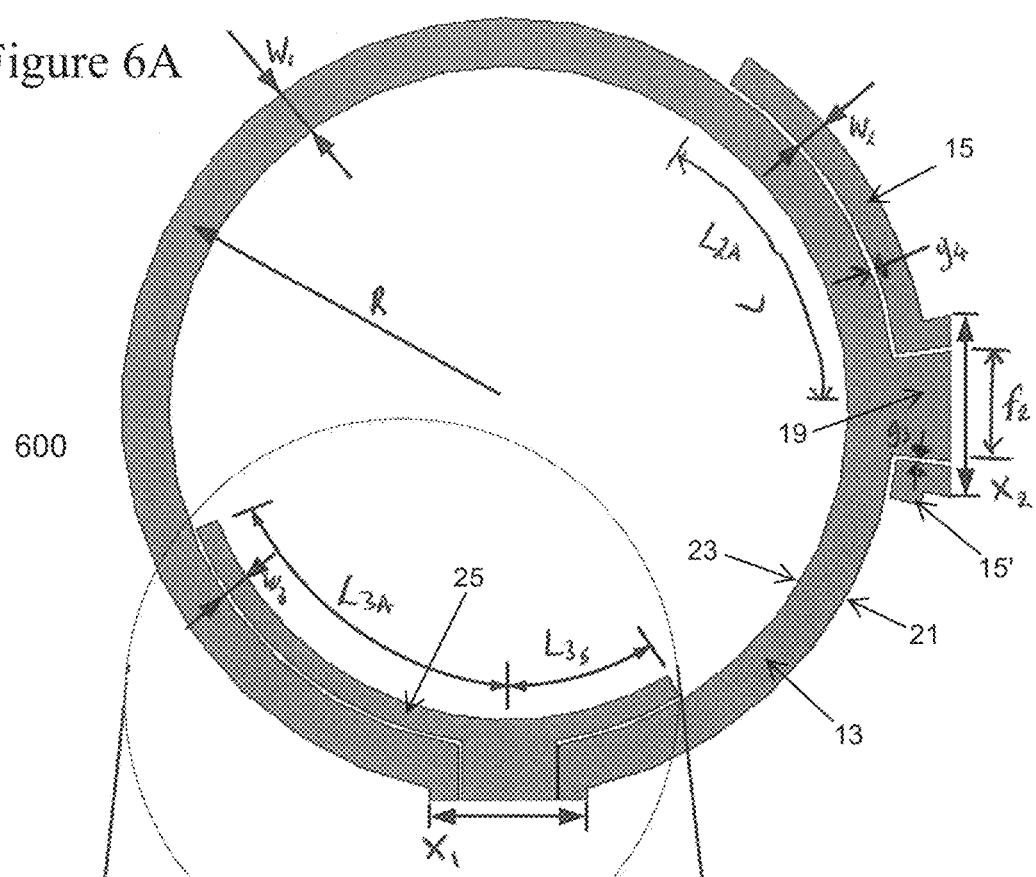
FIGS. 6A and 6B illustrate dimensions for an example implementation of an antenna, in accordance with the present disclosure.
Figure 6B:
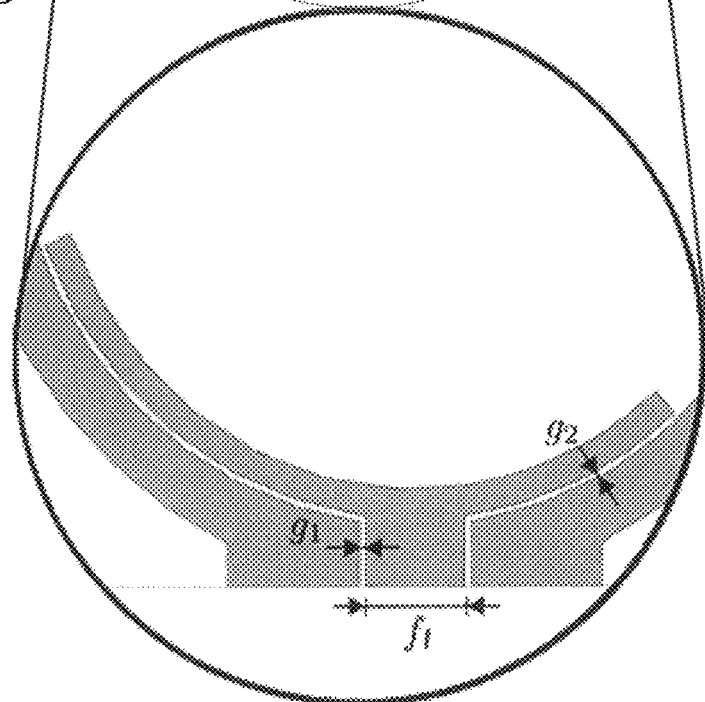

FIGS. 6A and 6B illustrate dimensions for an example implementation of an antenna, in accordance with the present disclosure. In this regard, shown in FIG. 6A is a plan view of an antenna 600, and shown in in FIG. 6B is a zoomed-in view of part of the antenna 600.

As illustrated in FIG. 6A, the antenna 600, corresponding to an example implementation in accordance with the present disclosure, may comprise an annular land, a first land 25, and a second land. These lands comprise flat, laminar, areas of conductive material disposed on the surface of a flat dielectric substrate. The annular land comprises an annulus with a break in the annulus ring at a first location, and a stem 19 protruding from its outward edge 21 at a second location. The first land 25 may be T-shaped, wherein the 'horizontal' T-bar of the T is arc-shaped, and the stem of the T-shape sits in the break through the annulus. The stem of the T-bar may be used as a feed for connecting signal to the first land 25.

The arc-shaped T-bar sits adjacent the inward edge 23 of the annulus either side of the break. The second land may comprise two parts 15, 15', both adjacent the outward edge 21 of the annulus, and one on each side of the stem 19. These two parts may each be L-shaped, and they may be different in size. The larger of these two L-shaped parts 15, 15' may have may have an arc shaped back, the edge of which lies alongside the outward edge 21 of the annulus. The smaller of the two L shaped parts 15' may have one edge adjacent the outward edge 21 of the annulus 13, and another edge adjacent the stem 19 of the annulus. The smaller L-shaped part 15' of the second land is on the opposite side of the stem 19 from the larger L-shaped part 15.

The dimensions of these different parts of the antenna 600 may be chosen to lie within the ranges indicated in Table 1, below:

TABLE 1

| Label | Description | Lower limit | Upper limit |
|---|---|---|---|
| R | ring radius of annulus | 20 mm | 30 mm |
| W1 | ring width | 1.5 mm | 5 mm |
| f1 | feed width of first land (e.g. width of stem of T-shape) | 2 mm | 6 mm |
| f2 | feed width of annulus stem | 2 mm | 6 mm |
| W2 | width of curved part of second land | 1 mm | 3 mm |
| W3 | width of curved part of first land | 1 mm | 3 mm |
| L3a | length of side of curved part of first land that is directed away from second land around the ring | 20 mm | 30 mm |
| L3b | length of side of curved part of first land that is directed towards second land around the ring | 8 mm | 16 mm |
| L2A | length of curved part of second land that is directed away from the first land around the ring | 20 mm | 30 mm |
| g1 | width of gap between end edge of annulus and adjacent edge of feed to the first land | 0.1 mm | 0.8 mm |
| g2 | width of gap between inward edge of annulus and adjacent edge of curved part of the first land | 0.1 mm | 0.8 mm |
| g3 | width of gap between edge of outwardly directed part of second land and adjacent edge of the stem of the annular land | 0.1 mm | 0.8 mm |
| g4 | width of gap between edge of curved part of second land and adjacent outward edge of the annular land | 0.1 mm | 0.8 mm |
| X2 | combined width of second land and stem of annular land | 5 mm | 20 mm |
| X1 | combined width of stem of first land and adjacent feed to annular land | 5 mm | 20 mm |

It should be understood, however, that the values in the table above correspond to a non-limiting implementation of the present disclosure, and as such these values are merely exemplary, and that different values may be used.

Various types of substrate may be used in implementing antennas in accordance with the present disclosure. For example, in some implementations the substrate be may be ROGERS 4003C (with relative permittivity of 3.38. In other implementations other substrates, such as FR4 (with relative permittivity of 4-5) may be used. The use of different substrate may entail or require making adjustments to some of the parameters of the antenna. Nonetheless, the different substrate may typically only slightly change the parameters (sizes and physical parameters) of the antenna. The substrate thickness may be less than about 1.5 mm or 2 mm to reduce undesirable surface waves which in turn adversely affect the radiation pattern of the antenna.

The substrate may have a margin which extends beyond the edge of the conductive lands by a distance selected to avoid deviation of the fields in those areas, for example there may be sufficient margin at the edge of the substrate (around the conductive lands) to reduce perturbation of the E-field at the edge of the conductors (e.g., ring and ground).

The length of the first conductive land and or the second conductive land along the edge of the ring may vary. For example, as shown in FIG. 1, the length as extending along about ¼ or about ⅓ of the circumference of the annulus. However, other lengths may be used.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:
1. An antenna comprising:
a planar dielectric substrate;
a first conductive annulus on a first surface of the substrate;
a first conductive land on the first surface, wherein the first conductive land lies in a region of the first surface bounded by the first conductive annulus and an edge of the first conductive land that is adjacent to, and parallel to, a portion of an inward edge of the first conductive annulus;

a second conductive land provided on the first surface wherein an edge of the second conductive land that is adjacent to, and parallel to, a portion of an outward edge of the first conductive annulus; and a first signal connection connected to the first conductive land, and a second signal connection connected to an edge of the first conductive annulus adjacent the second conductive land, wherein an edge of the first conductive annulus adjacent to the first conductive land is grounded, and the second conductive land is grounded.

2. The antenna of claim 1, wherein the first conductive land comprises a first arc on the first surface.

3. The antenna of claim 2, wherein the first conductive land further comprises a first stem connected to the first arc and the first stem is separate from the first conductive annulus.

4. The antenna of claim 3, wherein the first stem is disposed on the first surface and transects a portion of the first conductive annulus from the inward edge to the outward edge.

5. The antenna of claim 2, wherein the second conductive land comprises a second arc on the first surface.

6. The antenna of claim 1, comprising a second stem connected to the outward edge of the first conductive annulus.

7. The antenna of claim 6, wherein the second stem is disposed on the first surface.

8. The antenna of claim 7, wherein the second stem lies adjacent to and parallel to a radially aligned edge of the second conductive land.

9. The antenna of claim 6, wherein an angular separation about the circumference of the annulus between the first stem and the second stem is 90°.

10. The antenna of claim 1, wherein the first conductive land and the second conductive land are disposed adjacent to edges of different portions of the first conductive annulus.

11. The antenna of claim 1, wherein the second conductive land comprises an arc shaped portion parallel to the outside edge of the first conductive annulus, and a third stem joined to the arc shaped portion and lying parallel to the first stem.

12. A multiple-input and multiple-output (MIMO) apparatus comprising:
an antenna comprising a conductive annulus on a first surface of a planar dielectric substrate;
a first conductive land on the first surface, wherein the first conductive land lies in a region of the first surface bounded by the conductive annulus;
a second conductive land provided on the first surface, wherein an edge of the second land is adjacent an outward edge of the conductive annulus;
a first transmit/receive (Tx/Rx) component that comprises one or more circuits configured for transmission and reception of radio frequency (RF) signals; and
a second transmit/receive (Tx/Rx) component that comprises one or more circuits configured for transmission and reception of radio frequency (RF) signals;
wherein:
the first transmit/receive (Tx/Rx) component is connected to the first land;
the second transmit/receive (Tx/Rx) component is connected to the conductive annulus; and
the first transmit/receive (Tx/Rx) component is configured to provide a first input/output channel, and the second transmit/receive (Tx/Rx) component is configured to provide second input/output channel.

13. The MIMO apparatus of claim 12, wherein an edge of the first conductive land is adjacent to, and parallel to, an inward edge of the conductive annulus, and the edge of the second land is and parallel to the outward edge of the conductive annulus.

14. The MIMO apparatus of claim 12, wherein the first conductive land comprises a first arc on the first surface.

15. The MIMO apparatus of claim 14, wherein the first conductive land further comprises a first stem connected to the first arc and the first stem is separate from the conductive annulus and transects a portion of the annulus.

16. The MIMO apparatus of claim 12, wherein:
the first transmit/receive (Tx/Rx) component comprises is configured to provide a first input/output channel using a first polarization mode of the antenna; and
the second transmit/receive (Tx/Rx) component is configured to provide a second input/output channel using a second polarization mode of the antenna.

17. The MIMO apparatus of claim 16, wherein the first polarization mode of the antenna is orthogonal to the second polarization mode of the antenna.

18. The MIMO apparatus of claim 16, wherein the first polarization mode and the second polarization mode comprise fundamental modes of the antenna.

19. An antenna comprising:
a planar dielectric substrate;
a first conductive annulus on a first surface of the substrate;
a first conductive land on the first surface, wherein the first conductive land lies in a region of the first surface bounded by the first conductive annulus and an edge of the first conductive land that is adjacent to, and parallel to, a portion of an inward edge of the first conductive annulus;
a second conductive land provided on the first surface wherein an edge of the second conductive land that is adjacent to, and parallel to, a portion of an outward edge of the first conductive annulus; and
a first signal connection connected to an edge of the first conductive annulus adjacent to the first conductive land, and a second signal connection connected to the second conductive land,
wherein the first conductive land is grounded, and an edge of the first conductive annulus adjacent the second conductive land is grounded.

20. The antenna of claim 19, wherein the first conductive land comprises a first arc on the first surface.

21. The antenna of claim 20, wherein the first conductive land further comprises a first stem connected to the first arc and the first stem is separate from the first conductive annulus.

22. The antenna of claim 21, wherein the first stem is disposed on the first surface and transects a portion of the first conductive annulus from the inward edge to the outward edge.

23. The antenna of claim 20, wherein the second conductive land comprises a second arc on the first surface.

24. The antenna of claim 19, comprising a second stem connected to the outward edge of the first conductive annulus.

25. The antenna of claim 24, wherein the second stem is disposed on the first surface.

26. The antenna of claim 25, wherein the second stem lies adjacent to and parallel to a radially aligned edge of the second conductive land.

27. The antenna of claim 24, wherein an angular separation about the circumference of the annulus between the first stem and the second stem is 90°.

28. The antenna of claim 19, wherein the first conductive land and the second conductive land are disposed adjacent to edges of different portions of the first conductive annulus.

29. The antenna of claim 19, wherein the second conductive land comprises an arc shaped portion parallel to the outside edge of the first conductive annulus, and a third stem joined to the arc shaped portion and lying parallel to the first stem.

30. An antenna comprising:
a planar dielectric substrate;
a first conductive annulus on a first surface of the substrate;
a first conductive land on the first surface, wherein the first conductive land lies in a region of the first surface bounded by the first conductive annulus and an edge of the first conductive land that is adjacent to, and parallel to, a portion of an inward edge of the first conductive annulus; and
a second conductive land provided on the first surface wherein an edge of the second conductive land that is adjacent to, and parallel to, a portion of an outward edge of the first conductive annulus;
wherein the first conductive land comprises a first arc on the first surface,
wherein the first conductive land further comprises a first stem connected to the first arc and the first stem is separate from the first conductive annulus, and
wherein the first stem is disposed on the first surface and transects a portion of the first conductive annulus from the inward edge to the outward edge.

31. The antenna of claim 30, wherein the second conductive land comprises a second arc on the first surface.

32. The antenna of claim 30, comprising a second stem connected to the outward edge of the first conductive annulus.

33. The antenna of claim 32, wherein the second stem is disposed on the first surface.

34. The antenna of claim 33, wherein the second stem lies adjacent to and parallel to a radially aligned edge of the second conductive land.

35. The antenna of claim 32, wherein an angular separation about the circumference of the annulus between the first stem and the second stem is 90°.

36. The antenna of claim 30, wherein the first conductive land and the second conductive land are disposed adjacent to edges of different portions of the first conductive annulus.

37. The antenna of claim 30, wherein the second conductive land comprises an arc shaped portion parallel to the outside edge of the first conductive annulus, and a third stem joined to the arc shaped portion and lying parallel to the first stem.

38. An antenna comprising:
a planar dielectric substrate;
a first conductive annulus on a first surface of the substrate;
a first conductive land on the first surface, wherein the first conductive land lies in a region of the first surface bounded by the first conductive annulus and an edge of the first conductive land that is adjacent to, and parallel to, a portion of an inward edge of the first conductive annulus;
a second conductive land provided on the first surface wherein an edge of the second conductive land that is adjacent to, and parallel to, a portion of an outward edge of the first conductive annulus; and
a second stem connected to the outward edge of the first conductive annulus,
wherein an angular separation about the circumference of the annulus between the first stem and the second stem is 90°.

39. The antenna of claim 38, wherein the second stem is disposed on the first surface.

40. The antenna of claim 39, wherein the second stem lies adjacent to and parallel to a radially aligned edge of the second conductive land.

41. The antenna of claim 38, wherein the first conductive land and the second conductive land are disposed adjacent to edges of different portions of the first conductive annulus.

42. The antenna of claim 38, wherein the second conductive land comprises an arc shaped portion parallel to the outside edge of the first conductive annulus, and a third stem joined to the arc shaped portion and lying parallel to the first stem.

43. An antenna comprising:
a planar dielectric substrate;
a first conductive annulus on a first surface of the substrate;
a first conductive land on the first surface, wherein the first conductive land lies in a region of the first surface bounded by the first conductive annulus and an edge of the first conductive land that is adjacent to, and parallel to, a portion of an inward edge of the first conductive annulus;
a second conductive land provided on the first surface wherein an edge of the second conductive land that is adjacent to, and parallel to, a portion of an outward edge of the first conductive annulus; and
a second stem connected to the outward edge of the first conductive annulus,
wherein the second stem is disposed on the first surface, and
wherein the second stem lies adjacent to and parallel to a radially aligned edge of the second conductive land.

44. The antenna of claim 43, wherein the first conductive land and the second conductive land are disposed adjacent to edges of different portions of the first conductive annulus.

45. The antenna of claim 43, wherein the second conductive land comprises an arc shaped portion parallel to the outside edge of the first conductive annulus, and a third stem joined to the arc shaped portion and lying parallel to the first stem.

* * * * *